US007073325B2

(12) United States Patent
Nakatani et al.

(10) Patent No.: US 7,073,325 B2
(45) Date of Patent: Jul. 11, 2006

(54) EXHAUST EMISSION CONTROL METHOD AND SYSTEM

(75) Inventors: Koichiro Nakatani, Mishima (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/617,864

(22) Filed: Jul. 14, 2003

(65) Prior Publication Data

US 2004/0025499 A1  Feb. 12, 2004

(30) Foreign Application Priority Data

Aug. 6, 2002  (JP) .............................. 2002-228836

(51) Int. Cl.
*F01N 3/00*  (2006.01)

(52) U.S. Cl. .............................. 60/295; 60/274; 60/280; 60/286; 60/297; 60/303

(58) Field of Classification Search .................. 60/274, 60/278, 280, 285, 286, 287, 295, 297, 303
See application file for complete search history.

(56) References Cited

U.S. PATENT DOCUMENTS

| 5,832,722 | A | * | 11/1998 | Cullen et al. .................. 60/274 |
| 5,974,788 | A | * | 11/1999 | Hepburn et al. ............... 60/274 |
| 6,161,377 | A | * | 12/2000 | Boegner et al. ............... 60/274 |
| 6,502,391 | B1 | * | 1/2003 | Hirota et al. .................. 60/288 |
| 6,644,021 | B1 | * | 11/2003 | Okada et al. .................. 60/286 |
| 6,679,050 | B1 | * | 1/2004 | Takahashi et al. ............. 60/285 |
| 6,823,657 | B1 | * | 11/2004 | Waschatz et al. .............. 60/274 |

FOREIGN PATENT DOCUMENTS

| DE | 197 06 608 A1 | 8/1998 |
| DE | 198 13 654 A1 | 9/1999 |
| DE | 198 42 625 A1 | 3/2000 |
| DE | 198 55 090 A1 | 5/2000 |
| DE | 199 10 664 A1 | 9/2000 |
| DE | 100 20 639 A1 | 11/2000 |
| DE | 100 20 794 A1 | 6/2001 |
| DE | 101 02 132 A1 | 7/2002 |
| JP | A 9-287436 | 11/1997 |
| JP | A 11-148399 | 6/1999 |
| JP | A 11-190210 | 7/1999 |
| JP | A 11-350949 | 12/1999 |
| JP | A-2000-054900 | 2/2000 |
| JP | A-2000-130157 | 5/2000 |
| JP | A 2000-204935 | 7/2000 |
| JP | A-2000-257420 | 9/2000 |
| JP | A-2000-337129 | 12/2000 |
| JP | A-2001-173498 | 6/2001 |
| JP | A-2001-227333 | 8/2001 |

\* cited by examiner

*Primary Examiner*—Binh Q. Tran
(74) *Attorney, Agent, or Firm*—Oliff & Berridge, PLC (57) ABSTRACT

An emission control device stores SOx when the air/fuel ratio of exhaust gas is lean, and releases the stored SOx when the temperature of the emission control device is raised to a desulfurization temperature or higher and the air/fuel ratio of the exhaust gas becomes substantially equal to the stoichiometric air/fuel ratio or rich. The emission control device's temperature is controlled to be within a predetermined temperature range whose lower limit is substantially equal to or higher than the desulfurization temperature, and sulfur is released from the emission control device by controlling the air/fuel ratio of the exhaust gas to be substantially equal to the stoichiometric air/fuel ratio or rich when the temperature of the emission control device is within the predetermined temperature range. In the method, the temperature control process and the desulfurization process are repeated when sulfur is to be released from the emission control device.

24 Claims, 6 Drawing Sheets

EXHAUST EMISSION CONTROL METHOD AND SYSTEM

INCORPORATION BY REFERENCE

The disclosure of Japanese Patent Application No. 2002-228836 filed on Aug. 6, 2002, including the specification, drawings and abstract, is incorporated herein by reference in its entirety.

BACKGROUND OF THE INVENTION

1. Field of the Invention

The invention relates to exhaust emission control method and system for treating exhaust gas emitted from an internal combustion engine.

2. Description of Related Art

In a direct injection type internal combustion engine, such as a diesel engine, installed on an automobile, or the like, it is generally required to remove nitrogen oxides (NOx) contained in exhaust gas. To meet this requirement, it has been proposed to provide a NOx storage agent as one type of exhaust emission control means in an exhaust gas passage of the internal combustion engine.

The NOx storage agent used for removing NOx has the function of storing NOx when the air/fuel ratio of the exhaust gas is lean, and releasing the stored NOx for reduction and removal when the air/fuel ratio of the exhaust gas is reduced and a reductant, such as HC and CO, is present in the exhaust gas. By utilizing this function, the NOx storage agent stores NOx in the exhaust gas when the air/fuel ratio of the exhaust gas is lean, and reduction and removal of the NOx stored in the NOx storage agent are effected by, for example, supplying a reductant (e.g., fuel) to the NOx storage agent when or before the storage capacity of the NOx storage agent is reduced after a certain period of use.

The "storage" used in the present specification includes the meaning of both "absorption" and "adsorption". Here, "absorption" refers to storage of NOx in the form of nitrates, or the like, and "adsorption" refers to adsorption of NOx in the form of $NO_2$, or the like.

In the meantime, fuel used in the internal combustion engine may contain a sulfur component (S), and, in this case, exhaust gas emitted as a result of combustion of the fuel contains sulfur oxides (SOx). If SOx is present in the exhaust gas, the NOx storage agent stores SOx in the exhaust gas through the same mechanism as that for storing NOx.

It is, however, to be noted that SOx stored by the NOx storage agent is relatively stable, and generally tends to be accumulated in the NOx storage agent. If the amount of SOx accumulated in the NOx storage agent is increased, the NOx storage capacity of the NOx storage agent is reduced, and the NOx storage agent will not be able to sufficiently remove NOx from the exhaust gas. Thus, a problem of so-called sulfur poisoning (or S poisoning) occurs which results in a reduction of the NOx conversion efficiency. Particularly, the problem of sulfur poisoning is likely to occur in a diesel engine that uses light oil having a relatively large content of sulfur component as a fuel.

It is also known that the NOx storage agent is able to release SOx stored in the NOx storage agent through the same mechanism as that for releasing NOx. However, since SOx is stored in the NOx storage agent in a relatively stable form, it is difficult for the NOx storage agent to release SOx stored therein at a temperature (e.g., about 250° C. or higher) at which NOx is normally reduced and removed. In order to eliminate sulfur poisoning, therefore, sulfur regeneration control needs to be performed periodically, in which the temperature of the NOx. storage agent is raised to a sulfur release (or desulfurization) temperature (e.g., 600° C.) or higher, which is higher than the NOx reduction/removal temperature, and the air/fuel ratio of the exhaust gas flowing through the NOx storage agent is controlled to be substantially equal to the stoichiometric air/fuel ratio or rich (hereinafter simply said "controlled to be rich"). The desulfurization temperature mentioned herein is the lowest temperature that permits sulfur to be released from the NOx storage agent.

One method of performing the sulfur regeneration control as disclosed in, for example, Japanese Laid-open Patent Publication No. 2000-291462, utilizes so-called low-temperature combustion. The low-temperature combustion is performed by recirculating a considerably large amount of exhaust gas from the exhaust side to the intake side of the engine, and causing combustion in the combustion chamber while the temperature of fuel and gas surrounding the fuel is kept at a relatively low level by utilizing the endothermic effect of the recirculated gas (EGR gas), so as to suppress generation of smoke. If the low-temperature combustion is performed in this manner, a large amount of a reductant (such as HC and CO) is contained in the exhaust gas, and the temperature of the NOx storage agent disposed in the exhaust gas passage is raised to the desulfurization temperature or higher mainly due to the reaction of the reductant. In this case, since differences in the temperature among respective portions of the NOx storage agent are relatively small, almost the entire volume of the NOx storage agent can be regenerated or recovered from sulfur poisoning by effecting low-temperature combustion while the air/fuel ratio is kept rich, or injecting a reductant at a location upstream of the NOx storage agent thereby to make the air/fuel ratio of the exhaust gas rich.

However, if the required torque of the engine is increased, namely, if a fuel injection quantity is increased, it becomes difficult to perform the low-temperature combustion because the temperature of fuel and surrounding gas is raised at the time of combustion. Namely, the low-temperature combustion can be performed only when the engine is in a low-load operating state in which the quantity of heat generated due to combustion is relatively small. Thus, the sulfur regeneration method for regenerating the NOx storage agent by utilizing the low-temperature combustion cannot be performed while the engine is operating at a high load.

In another known method of performing the sulfur regeneration control as disclosed in, for example, Japanese Laid-open Patent Publication No. 11-350949, fuel serving as a reductant is injected into an exhaust gas passage upstream of the NOx storage agent. In this case, the temperature of the NOx storage agent is raised due to reaction of the fuel thus injected. This method enables sulfur regeneration to be carried out even in an engine operating region in which the above-described low-temperature combustion cannot be performed.

However, if the injection of the fuel or reductant is employed for keeping the air/fuel ratio in a rich region, the temperature of the NOx storage agent is gradually increased due to reaction of the fuel or reductant in the NOx storage agent, and may exceed a heat deterioration temperature at which the NOx storage agent suffers heat deterioration, depending upon the operating state of the engine. In particular, when the fuel or reductant injected into the exhaust gas passage has a relatively low reactivity, the temperature is normally likely to be raised in a downstream portion of the NO storage agent, and this portion may be excessively heated, namely, its temperature may exceed the heat deterioration temperature.

SUMMARY OF THE INVENTION

It is therefore an object of the invention to provide exhaust emission control method and system, which permit release of sulfur, from an emission control device in a wider range of engine operating conditions, without excessively raising the temperature of the emission control device.

To accomplish the above and/or other object(s), there is provided according to one aspect of the invention an exhaust emission control method for treating exhaust gas emitted from an internal combustion engine, comprising the steps of: (a) locating an emission control device in an exhaust gas passage of the internal combustion engine, the emission control device storing SOx when an air/fuel ratio of exhaust gas flowing through the emission control device is lean, and releasing the stored SOx when a temperature of the emission control device is raised to a desulfurization temperature or higher and the air/fuel ratio of the exhaust gas flowing through the emission control device becomes substantially equal to a stoichiometric air/fuel ratio or rich, (b) performing a temperature control process to control the temperature of the emission control device to be within a predetermined temperature range whose lower limit is substantially equal to or higher than a desulfurization temperature, and (c) performing a desulfurization process to release sulfur from the emission control device by controlling the air/fuel ratio of the exhaust gas flowing through the emission control device to be substantially equal to the stoichiometric air/fuel ratio or rich when the temperature of the emission control device is within the predetermined temperature range. In the exhaust emission control method, the temperature control process and the desulfurization process are repeated when sulfur is to be released from the emission control device.

According to the method as described above, the temperature control process and the desulfurization process are repeatedly performed so that sulfur is released from the emission control device. Accordingly, release of a sulfur component (e.g., sulfur regeneration) can be effected even in an engine operating state in which the temperature of the emission control device would be excessively raised if the air/fuel ratio of the exhaust gas flowing through the emission control device is kept substantially equal to the stoichiometric air/fuel ratio or rich for a prolonged time so as to release the sulfur component. Namely, according to the above aspect of the invention, if there is a possibility that the temperature of the emission control device increases to be higher than the predetermined temperature range and the emission control device is excessively heated in the desulfurization process, the temperature of the emission control device is controlled to a temperature level within the temperature range in the following temperature control process, and is thus prevented from being excessively raised. This temperature control process is then followed by another desulfurization process in which the sulfur component is released from the emission control device again. Thus, the method according to the above aspect of the invention makes it possible to release the sulfur component from the emission control device in a wider range of engine operating conditions without excessively raising the temperature of the emission control device.

In one embodiment of the invention as described above, the temperature of the emission control device is raised or lowered in the temperature control process by controlling the air/fuel ratio of the exhaust gas flowing through the emission control device.

Since the amount of the fuel (or reductant) subjected to reaction in the emission control device can be increased or reduced by suitably controlling the air/fuel ratio of the exhaust gas flowing through the emission control device, the temperature of the emission control device can be raised or lowered through control of the air/fuel ratio. Thus, the temperature of the emission control device can be controlled by a simple method.

In another embodiment of the invention, an amount of the exhaust gas flowing through the emission control device is larger in the temperature control process than that in the desulfurization process.

In the case where the amount of the exhaust gas flowing through the emission control device is controllable, release of sulfur from the emission control device can be promoted by controlling the amount of the exhaust gas to a desirable value in each of the temperature control process and the desulfurization process. More specifically, when the temperature of the emission control device needs to be raised by injecting fuel as a reductant into the exhaust gas passage in the temperature control process, the amount of the exhaust gas flowing through the emission control device is increased so that a larger amount of oxygen is supplied to the emission control device, whereby the temperature of the emission control device can be increased in a short time. When the air/fuel ratio of the exhaust gas flowing through the emission control device needs to be made substantially equal to the stoichiometric air/fuel ratio or rich by injecting fuel as a reductant into the exhaust gas passage in the desulfurization process, the required amount of the fuel (or reductant) can be reduced by reducing the amount of the exhaust gas flowing through the emission control device. In this case, since a temperature increase in the desulfurization process is suppressed, release of sulfur (e.g., sulfur regeneration) can be effected even in an engine operating state in which the temperature of the emission control device would be excessively raised if the amount of the exhaust gas cannot be controlled.

In the above embodiment of the invention, therefore, release of sulfur from the emission control device can be promoted or accelerated, and can be performed in an even wider range of engine operating conditions without excessively increasing the temperature of the emission control device.

In the method according to the above aspect of the invention, the temperature control process and the desulfurization process may be repeated until release of sulfur from the emission control device is finished. In this case, release of sulfur from the emission control device, or sulfur regeneration of the emission control device, can be accomplished with high reliability.

Alternatively, the temperature control process and the desulfurization process may be repeated a predetermined number of times. In this case, the control process can be simplified.

In a still another embodiment of the invention, the temperature control process continues for a first predetermined period of time and the desulfurization process continues for a second predetermined period of time. In this case, the control process can be simplified.

In the above embodiment of the invention, the first predetermined period of time for the temperature control process may be corrected according to a rate of increase or decrease of the temperature of the emission control device, and the second predetermined period of time for the desulfurization process may be corrected according to a speed of release of sulfur from the emission control device.

With the above arrangement, the control is performed in accordance with the actual situation, and the temperature control process and the desulfurization process are carried out with high efficiency, so that sulfur can be surely released from the emission control device.

In a further embodiment of the invention, the air/fuel ratio of the exhaust gas flowing through the emission control device is controlled in the temperature control process according to a rate of increase or decrease of the temperature of the emission control device, and the air/fuel ratio of the exhaust gas flowing through the emission control device is controlled in the desulfurization process according to a speed of release of sulfur from the emission control device.

With the above arrangement, the control is performed in accordance with the actual situation, and the temperature control process and the desulfurization process are carried out with high efficiency, so that sulfur can be surely released from the emission control device.

The emission control device used in the method of the invention may include a NOx storage agent that stores NOx when the air/fuel ratio of the exhaust gas flowing through the NOx storage agent is lean, and releases the stored NOx for reduction and removal when the air/fuel ratio of the exhaust gas flowing through the NOx storage agent is reduced and a reductant is present in the exhaust gas. In this case, NOx contained in the exhaust gas is stored or trapped by the NOx storage agent, and the stored NOx is released from the NOx storage agent for reduction and removal.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Figure 1:
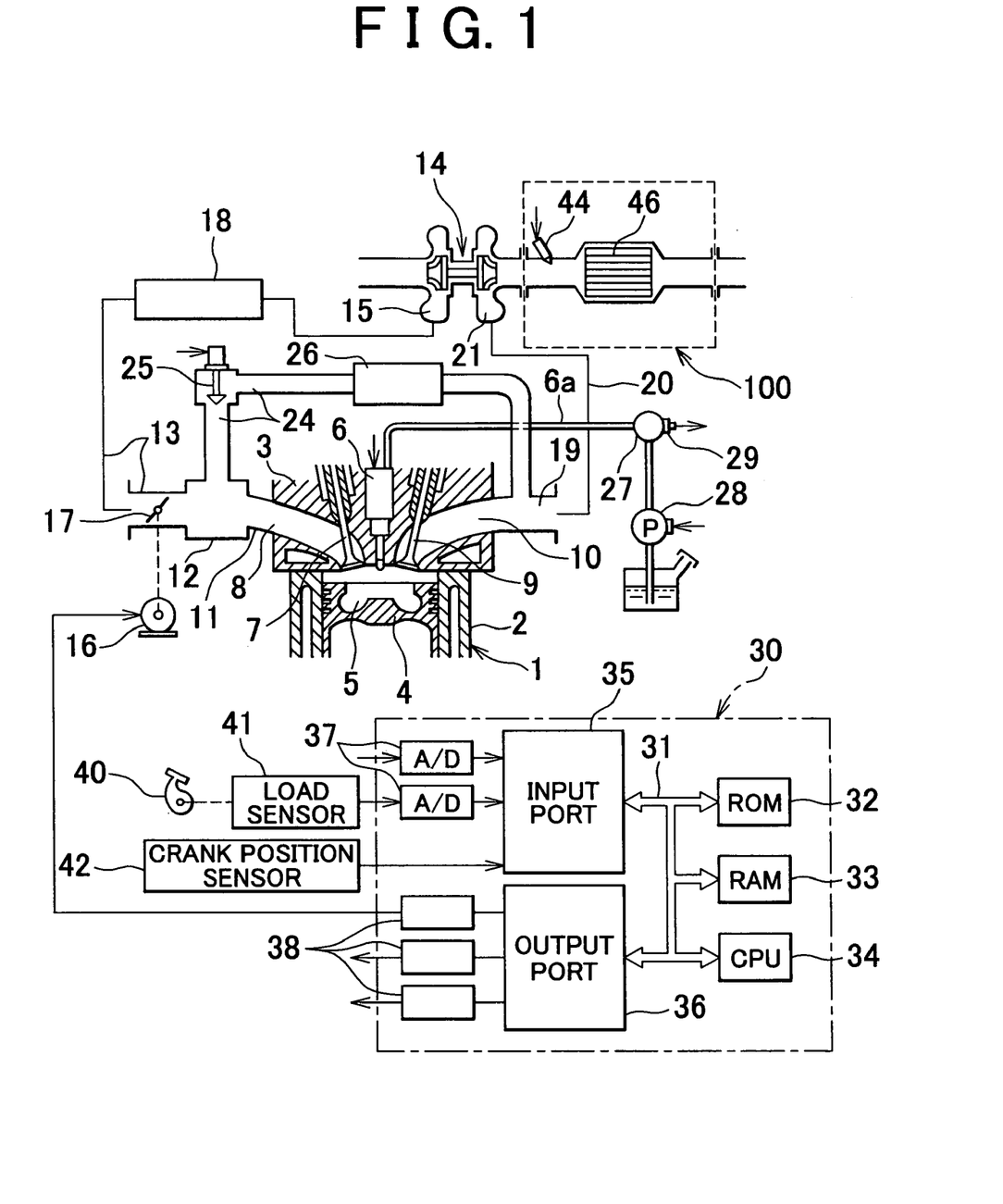
FIG. 1 is a view showing a system in which an exhaust emission control method according to one embodiment of the invention is applied to a direct fuel injection, compression ignition type internal combustion engine.

Exemplary embodiments of the invention will be described in detail with reference to the drawings. FIG. 1 shows a system in which an exhaust emission control method according to one embodiment of the invention is applied to a direct fuel injection, compression ignition type internal combustion engine. The invention may also be applied to spark ignition type internal combustion engines.

The system shown in FIG. 1 includes an engine body 1, a cylinder block 2, a cylinder head 3, a piston 4, a combustion chamber 5, an electrically controlled fuel injector 6, an intake valve 7, an intake port 8, an exhaust valve 9 and an exhaust port 10. The intake port 8 communicates with a surge tank 12 via a corresponding intake branch pipe 11, and the surge tank 12 is connected to a compressor 15 of an exhaust turbocharger 14 via an intake duct 13. A throttle valve 17 adapted to be driven by a step motor 16 is disposed in the intake duct 13, and a cooling device 18 for cooling intake air flowing in the intake duct 13 is located around the intake duct 13. In the system shown in FIG. 1, engine coolant is fed to the cooling device 18, so that the intake air is cooled by the engine coolant in the cooling device 18.

On the other hand, an exhaust port 10 is connected to an exhaust turbine 21 of the exhaust turbocharger 14 via an exhaust manifold 19 and an exhaust pipe 20, and an emission control device 100 is coupled to an outlet of the exhaust turbine 21. The emission control device 100 incorporates a NOx storage agent 46. In addition, a reductant injection nozzle 44 for injecting a reductant into an exhaust path as needed is provided upstream of the NOx storage agent 46. It is, however, to be understood that the reductant injection nozzle 44 may be disposed at any location between the NOx storage agent 46 and the exhaust port 10.

In the present specification, expressions such as "an upstream portion of the NOx storage agent" and "a downstream portion of the NOx storage agent" are employed to mean "a NOx storage agent supported on an upstream portion of a support" and "a NOx storage agent supported on a downstream portion of the support", for the sake of convenience.

The exhaust manifold 19 and the surge tank 12 are connected to each other through an exhaust gas recirculation passage (which will be called "EGR passage") 24. An electrically controlled EGR control valve 25 is disposed in the EGR passage 24. Also, a cooling device 26 for cooling EGR gas flowing in the EGR passage 24 is disposed around the EGR passage 24. In the system shown in FIG. 1, engine coolant is fed to the cooling device 26, so that the EGR gas is cooled by the engine coolant. In the meantime, each of the fuel injectors 6 for respective cylinders is connected to a fuel reservoir or a common rail 27 via a corresponding fuel supply pipe 6a. Fuel is supplied from an electrically controlled fuel pump whose fuel delivery amount is variable to the common rail 27, and the fuel supplied to the common rail 27 is then supplied to the fuel injector 6 via the corresponding fuel supply pipe 6a. To the common rail 27 is attached a fuel pressure sensor 29 for detecting a fuel pressure in the common rail 27. In operation, the delivery amount of the fuel pump 28 is controlled based on an output signal of the fuel pressure sensor 29 so that the fuel pressure in the common rail 27 becomes equal to a target fuel pressure.

An electronic control unit (ECU) 30 mainly consists of a digital computer, and includes a ROM (read-only memory) 32, RAM (random access memory) 33, CPU (microprocessor) 34, an input port 35 and an output port 36, which are connected to one another by a bi-directional bus 31. The input port 35 receives an output signal of the fuel pressure sensor 29 via a corresponding A/D converter 37. A load sensor 41 that generates an output voltage proportional to an amount L of depression of an accelerator pedal 40 is connected to the accelerator pedal 40, and the input port 35 receives an output signal of the load sensor 41 via a corresponding A/D converter 37. A crank position sensor 42 that generates an output pulse each time the crankshaft rotates 30°, for example, is also connected to the input port 35. On the other hand, the output port 36 is connected to the fuel injectors 6, the step motor 16 for driving the throttle valve 17, the EGR control valve 25, the reductant injection nozzle 44 and the fuel pump 28, via corresponding drive circuits 38.

Next, the NOx storage agent 46 will be described in greater detail. The NOx storage agent 46 consists mainly of, for example, at least one element selected from alkali metals, such as potassium (K), sodium (Na), lithium (Li) and cesium (Cs), alkali earth metals, such as barium (Ba) and calcium (Ca), and rare earth metals, such as lanthanum (La) and yttrium (Y), and a precious metal such as platinum (Pt). The NOx storage agent 46 stores NOx when the air/fuel ratio of exhaust gas flowing through the NOx storage agent 46 (which will be called "flow-through exhaust gas" when appropriate) is lean, and releases the stored NOx in the presence of a reductant so that the NOx is reduced by the reductant and is thus removed from the NOx storage agent 46. Thus, the NOx storage agent 46 has a function of storing, releasing, reducing and removing NOx.

During a normal operation of the compression ignition type internal combustion engine as shown in FIG. 1, the air/fuel ratio of the exhaust gas is normally lean, and the NOx storage agent 46 stores NOx in the exhaust gas. When a reductant is supplied from the reductant injection nozzle 44 into the exhaust gas passage upstream of the NOx storage agent 46, the air/fuel ratio of exhaust gas flowing through the NOx storage agent 46 is reduced. In the presence of the reductant thus introduced, the NOx storage agent 46 releases the stored NOx, and the released NOx is reduced by the reductant and is thus removed from the NOx storage agent 46.

Figure 2A:
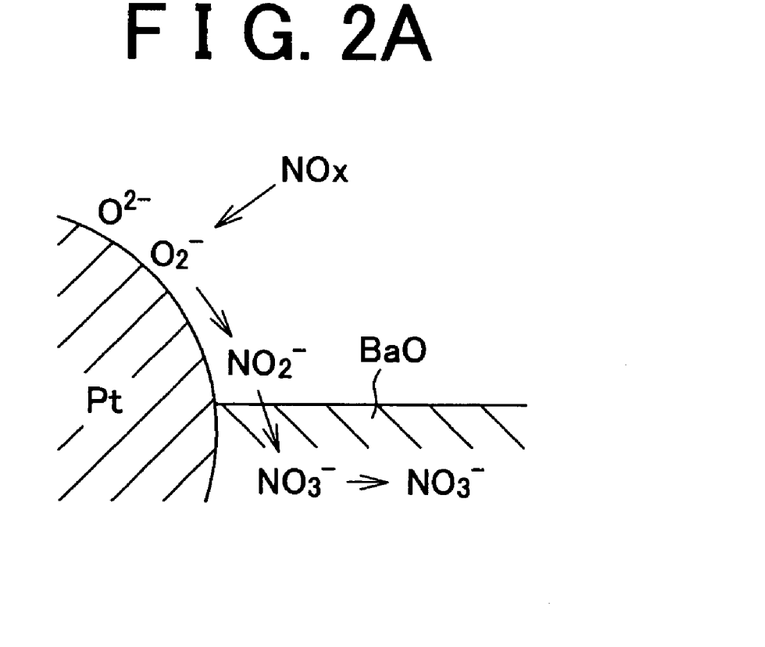
FIG. 2A is a view useful for explaining the function of a NOx storage agent to store NOx.
Figure 2B:
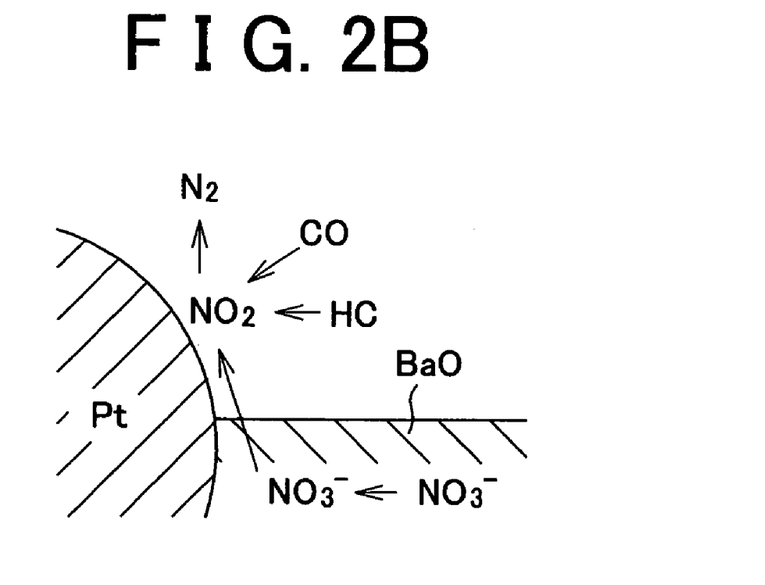
FIG. 2B is a view useful for explaining the function of the NOx storage agent to release NOx to be reduced and removed.

While the detailed mechanism for storage, release, reduction and removal of NOx has not been fully clarified, the storage, release, reduction and removal of NOx are assumed be performed through a mechanism as shown in FIG. 2A and FIG. 2B by way of example. This mechanism will be hereinafter explained with respect to the case where platinum Pt and barium Ba are supported on the support, and NOx is stored in the form of nitrate.

When the exhaust gas flowing through the NOx storage agent 46 has a considerably lean (i.e., large) air/fuel ratio, the oxygen concentration in the flow-through exhaust gas is greatly increased, and oxygen $O_2$ adheres to the surface of platinum Pt in the form of $O_2^-$ or $O^{2-}$, as shown in FIG. 2A. On the other hand, NO contained in the flow-through exhaust gas reacts with $O_2^-$ or $O^{2-}$ on the surface of platinum Pt, to form $NO_2$ ($2NO+O_2 \rightarrow 2NO_2$). A part of $NO_2$ thus formed is stored or trapped in the NOx storage agent 46 while being further oxidized on platinum Pt, and is diffused into the NOx storage agent 46 in the form of nitrate ions $NO_3^-$ as shown in FIG. 2A while being combined with barium oxide BaO. In this manner, NOx is stored in the NOx storage agent 46.

$NO_2$ is produced on the surface of platinum Pt as long as the oxygen concentration in the flow-through exhaust gas is high, and the $NO_2$ is stored in the NOx storage agent 46 to form nitrate ions $NO_3^-$ as long as the NOx storage capacity of the NOx storage agent 46 is not saturated. To the contrary, if the oxygen concentration in the flow-through exhaust gas is lowered, and the amount of $NO_2$ formed on the platinum Pt is reduced, the reaction proceeds in the opposite direction (i.e., $NO_3^- \rightarrow NO_2$), and nitrate ions $NO_3^-$ stored in the NOx storage agent 46 are released from the NOx storage agent 46 in the form of $NO_2$. Namely, when the oxygen concentration in the exhaust gas flowing through the NOx storage agent 46 is lowered, NOx is released from the NOx storage agent 46. If the degree of leanness of the exhaust gas flowing through the NOx storage agent 46 is reduced, the oxygen concentration in the flow-through exhaust gas is lowered whereby NOx is released from the NOx storage agent 46.

If the air/fuel ratio of the exhaust gas flowing through the NOx storage agent 46 is reduced in this situation, HC and CO in the exhaust gas react with oxygen $O_2^-$ or $O^{2-}$ on the platinum Pt, to be oxidized. Also, if the air/fuel ratio of the flow-through exhaust gas is reduced, the oxygen concentration in the exhaust gas is considerably lowered, and therefore $NO_2$ is released from the NOx storage agent 46, so that the $NO_2$ reacts with unburned HC and CO to be reduced and removed, as shown in FIG. 2B. If $NO_2$ disappears from the surface of platinum Pt, more and more $NO_2$ is released from the NOx storage agent 46. Thus, when the air/fuel ratio of the flow-through exhaust gas is reduced, and the reductant exists around the NOx storage agent 46, NOx is released from the NOx storage agent 46 in a short time, to be reduced and removed.

The air/fuel ratio of exhaust gas mentioned herein means the ratio of air to fuel supplied to the exhaust gas passage upstream of the NOx storage agent 46 and the combustion chamber or the intake passage. When neither air nor reductant is supplied to the exhaust gas passage, the air/fuel ratio of exhaust gas is equal to the operating air/fuel ratio of the engine (i.e., air/fuel ratio of an air-fuel mixture burned in the combustion chamber). In this embodiment, light oil serving as the fuel of the engine is used as the reductant so as to avoid complexity in storage and supply of the reductant.

Next, a mechanism of sulfur poisoning of the NOx storage agent 46 will be explained. If exhaust gas contains a SOx component, the NOx storage agent 46 stores SOx in the exhaust gas through the same mechanism as that for storage of NOx. Namely, when the air/fuel ratio of the exhaust gas is lean, SOx (such as $SO_2$) in the exhaust gas is oxidized on platinum Pt, to form $SO_3^-$ or $SO_4^-$, which is then combined with barium oxide BaO to form $BaSO_4$. Since $BaSO_4$ is relatively stable, and is likely to form large crystals, it is less likely to be dissolved and released once it is formed. If the amount of $BaSO_4$ thus formed in the NOx storage agent 46 is increased, the amount of BaO that can be used for storing NOx is reduced, and the NOx storage capacity is reduced.

In order to eliminate the sulfur poisoning, it is necessary to dissolve $BaSO_4$ formed in the NOx storage agent 46 at a high temperature, and reduce sulfate ions, such as $SO_3^-$ or $SO_4^-$ formed by dissolution, under an atmosphere having approximately the stoichiometric air/fuel ratio (including a slightly lean air/fuel ratio) or a rich air/fuel ratio (which atmosphere will be simply called "rich atmosphere"), so that the sulfate ions are converted into gaseous $SO_2$, which is released from the NOx storage agent 46. Thus, the NOx storage agent 46 needs to be exposed to a high-temperature, rich atmosphere so as to be regenerated or recovered from sulfur poisoning.

While so-called low-temperature combustion may be utilized in one of sulfur regeneration methods, this method may be carried out only when the engine is in a low-load operating condition, as discussed above. In another sulfur regeneration method, a reductant (e.g., fuel) is injected into the exhaust gas passage upstream of the NOx storage agent, so as to raise the temperature of the NOx storage agent and create a rich atmosphere. In this method, however, if the air/fuel ratio of the exhaust gas flowing through the NOx storage agent is kept controlled to be in a rich region, the temperature of the NOx storage agent is gradually increased due to reaction of the reductant in the NOx catalyst, and may be excessively increased depending upon the operating conditions of the engine. In particular, where the reductant injected into the exhaust gas passage has a relatively low reactivity, the temperature generally tends to be increased at a downstream portion of the NOx storage agent, and the temperature of this portion may exceed a heat deterioration temperature at which heat deterioration occurs.

As is understood from the above description, the engine operating conditions that permit sulfur regeneration of the NOx storage agent are limited to only part of engine operating conditions.

In view of the above situation, the invention aims at realizing sulfur regeneration in a wider range of engine operating conditions, without excessively raising the temperature of the NOx storage agent (or emission control device).

Figure 3:
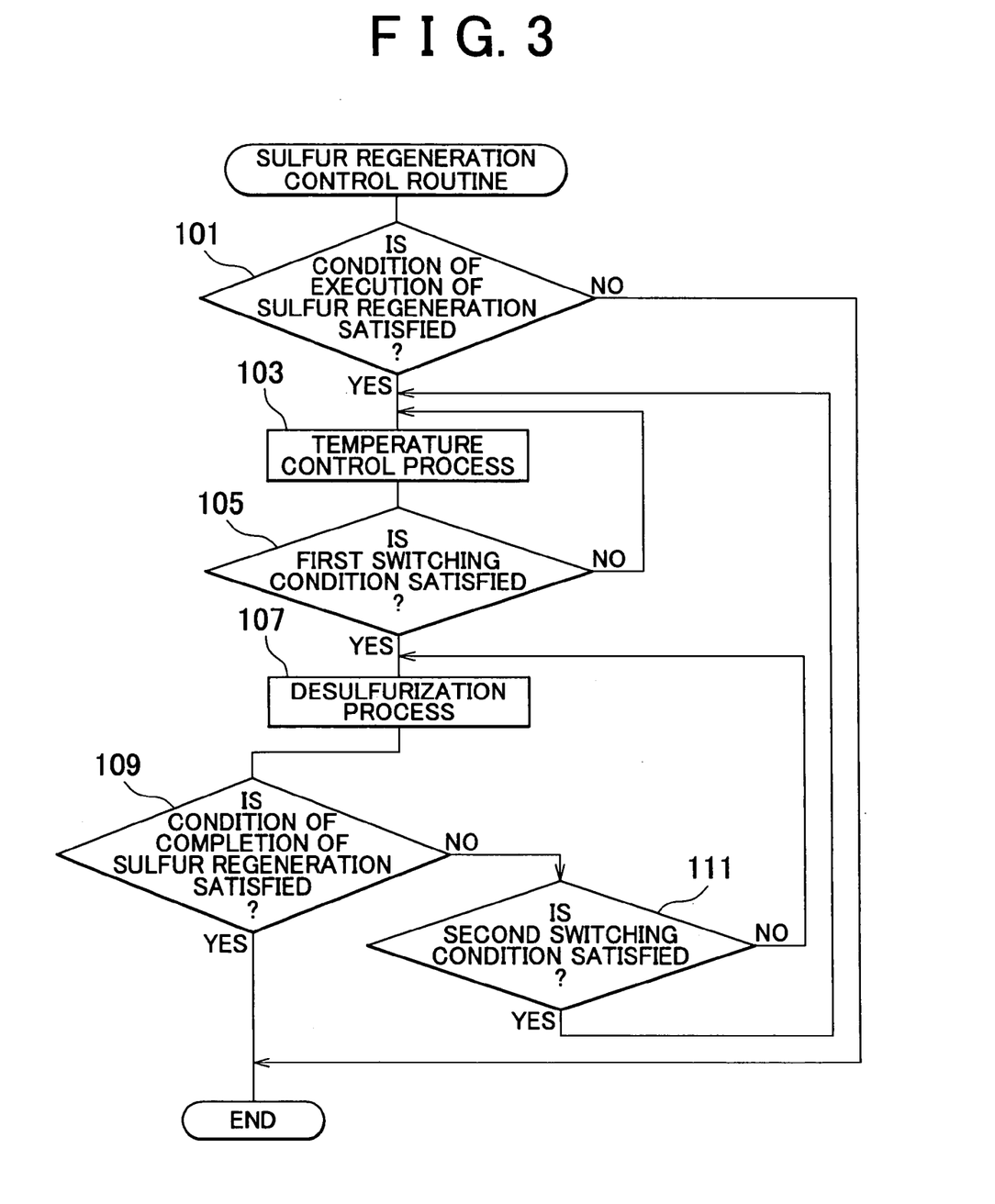
FIG. 3 is a flowchart showing a control routine according to which a sulfur regeneration method according to the embodiment of the invention is performed.

Next, an exhaust emission control method that permits sulfur regeneration on the internal combustion engine shown in FIG. 1 in a wider range of engine operating conditions will be described with reference to FIG. 3. FIG. 3 is a flowchart showing a control routine executed to carry out this method. The ECU 30 executes this control routine as an interrupt routine at predetermined time intervals.

Upon a start of the control routine, it is determined in step 101 whether a condition under which sulfur (S) regeneration of the NOx storage agent 46 is performed is satisfied. For example, the condition under which sulfur regeneration is performed is that the amount of SOx stored in the NOx storage agent 46 becomes equal to or larger than a predetermined amount. In this case, since it is difficult to directly obtain the stored SOx amount, the stored SOx amount is estimated based on the amount of SOx emitted from the internal combustion engine, which is represented by, for example, the vehicle running distance. Namely, it is determined that the condition for execution of sulfur regeneration is satisfied when the running distance measured from a point of time when sulfur regeneration was conducted last time becomes larger than a predetermined value.

If it is determined in step 101 that the condition for execution of sulfur regeneration is not satisfied, the present control routine is finished. If it is determined that the condition for execution of sulfur regeneration is satisfied, the control proceeds to step 103.

In step 103, a temperature control process is performed. The temperature control process is to control the temperature of the NOx storage agent 46 to be within a predetermined temperature range that permits release of sulfur from the NOx storage agent 46. The lower-limit temperature of the temperature range may be set to, for example, a sulfur release (or desulfurization) temperature (e.g., 600° C.), which is the lower-limit temperature that enables release of sulfur from the NOx storage agent 46. The upper-limit temperature of the temperature range may be set to, for example, a temperature that is lower than the heat deterioration temperature of the NOx storage agent 46. The upper-limit temperature may be determined so that the temperature does not reach the heat deterioration temperature for a while after a desulfurization process as described later starts.

In the temperature control process, the temperature of the NOx storage agent 46 is controlled to be within the predetermined temperature range. More specifically, the temperature of the NOx storage agent 46 is raised if it is lower than the lower-limit temperature of the temperature range, and the temperature of the NOx storage agent 46 is lowered if it is higher than the upper-limit temperature of the temperature range.

As one method of raising the temperature of the NOx storage agent 46, a reductant is injected from the reductant injection nozzle 44 into the exhaust gas passage. If the reductant is injected from the reduction injection nozzle 44, the reductant thus injected undergoes reaction at the NOx storage agent 46 so that the temperature of the NOx storage agent 46 can be raised. In this case, while specific conditions of injection of the reductant, including the amount of the reductant injected, may be determined depending upon a required degree of increase of the temperature, it is preferable to inject the reductant so that the average air/fuel ratio of the exhaust gas becomes lean, so as to prevent a rapid increase in the temperature and efficiently use the reductant for increasing the temperature.

As one method of lowing the temperature of the NOx storage agent 46, on the other hand, the amount of the reductant that is being injected is reduced, or the injection of the reductant is stopped. In this manner, the amount of the reductant that undergoes reaction at the NOx storage agent 46 is reduced, and heat of the NOx storage agent 46 is removed by the exhaust gas flowing through the NOx storage agent 46, so that the temperature of the NOx storage agent 46 can be lowered.

The air/fuel ratio of the exhaust gas flowing through the NOx storage agent 46 is reduced if the reductant is injected from the reductant injection nozzle 44, and is increased if the amount of the reductant injected is reduced or the injection of the reductant is stopped. It follows from the above description that in the temperature control process, the temperature of the NOx storage agent 46 is raised or lowered by controlling the air/fuel ratio of the exhaust gas flowing through the NOx storage agent 46.

In step 105 following step 103, it is determined whether a first switching condition for switching control from the temperature control process to the desulfurization process is satisfied. The first switching condition is basically that the temperature of the NOx storage agent 46 is within the predetermined temperature range. However, the condition may be more specifically set in various manners.

For example, in the present embodiment, a temperature sensor for measuring the temperature of the NOx storage agent 46 is not provided, and it is determined that the first switching condition is satisfied when the period of time for which the temperature control process continues to be performed reaches a predetermined time. The predetermined time may be set to a fixed time with respect to each of the case where the temperature of the NOx storage agent 46 is raised and the case where the temperature of the NOx storage agent 46 is lowered. In this case, the method of injecting the reductant may be fixed for each of the case where the temperature of the NOx storage agent 46 is raised and the case where the temperature of the NOx storage agent 46 is lowered, and the time required for the temperature of the NOx storage agent 46 to be raised or lowered to enter the predetermined temperature range may be determined in advance, so that the thus determined time is set as the above-indicated predetermined time. This method can advantageously simplify the control, but makes it difficult or impossible to perform subtle or sophisticated temperature control.

To perform more sophisticated temperature control, the predetermined time may be determined according to the operating conditions (e.g., engine load Q/N (flow rate of intake air Q/engine speed N), engine speed N and so forth) of the engine. Namely, the time required to increase or decrease the temperature of the NOx storage agent 46 to a level in the predetermined temperature range in relation to the engine operating conditions, the method of injecting the reductant, and so forth, may be determined in advance and plotted in the form of a map, and the predetermined time may be set according to the engine operating conditions at that time, based on the map.

Alternatively, a temperature sensor may be provided, and it may be determined whether the first switching condition is satisfied based on the temperature measured by the temperature sensor. In this case, it needs to be noted that the temperature range that provides a basis for the determination may differ from the above-described predetermined temperature range depending upon which portion of the NOx storage agent 46 has the temperature measured by the temperature sensor.

More specifically, when a reductant is injected into the exhaust passage, large temperature differences arise among respective portions of the NOx storage agent 46 since the reactivity of the reductant (e.g., fuel) is relatively low, for example. In general, the temperature of a downstream portion of the NOx storage agent 46 is more likely to increase than that of an upstream portion thereof. In the case where the temperature of the downstream portion of the NOx storage agent 46 is measured by the temperature sensor, therefore, there is a high possibility that the temperature of the other portions of the Nox storage agent 46 has not reached the desulfurization temperature even if the temperature of the downstream portion reaches the desulfurization temperature. In the case where the temperature of the upstream portion of the NOx storage agent 46 is measured by the temperature sensor, on the other hand, the temperature of the downstream portion of the NOx storage agent 46 may exceed the heat deterioration temperature by the time when the temperature of the upstream portion thus measured reaches the desulfurization temperature.

It will be understood from the above description that when the temperature sensor is provided, and it is determined whether the first switching condition is satisfied based on the measured temperature, the temperature range that provides the basis for the determination needs to be set in view of the portion of the NOx storage agent 46 for which the temperature is measured by the temperature sensor, and the temperature distribution that appears in the NOx storage agent 46. The temperature sensor may be provided in an upstream portion, a middle portion, or a downstream portion of the NOx storage agent 46, or may be located downstream of the NOx storage agent 46. In the latter case, the temperature of the exhaust gas is measured, and the temperature of the NOx storage agent 46 is estimated based on the exhaust gas temperature. While there is no particular limit to the position at which the temperature sensor is provided, it is desirable that the temperature sensor measures the temperature of the downstream portion of the NOx storage agent 46 so as to prevent heat deterioration of the NOx storage agent 46. In setting the temperature range that provides the basis for the determination, the upper-limit temperature and the lower-limit temperature of the temperature range to be set may be respectively set lower than those of the predetermined temperature range that permits release of sulfur as described above, in view of a temperature increase that occurs after the desulfurization process as described later starts.

If it is determined in step 105 that the first switching condition is not satisfied, the control returns to step 103 to continue the temperature control process. If it is determined that the first switching condition is satisfied, the control proceeds to step 107.

In step 107, the desulfurization process is carried out. In the desulfurization process, the air/fuel ratio of the exhaust gas flowing through the NOx storage agent 46 is controlled to be substantially equal to the stoichiometric air/fuel ratio or rich (hereinafter simply said "controlled to be rich"), and sulfur is released from the NOx storage agent 46.

As one method of controlling the air/fuel ratio of the exhaust gas passing through the NOx storage agent 46, a reductant is injected from the reduction injection nozzle 44 into the exhaust gas passage. The injection of the reductant in the desulfurization process for making the air/fuel ratio of the exhaust gas rich is conducted in a different manner from the injection of the reductant in the temperature control process, in terms of the amount of the reductant injected and other conditions. For example, when a process of injecting the reductant consists of a plurality of times of injection from the reductant injection nozzle 44, the amount of the injected reductant per injection or the injection duration in the desulfurization process is made larger or longer than that in the temperature control process, or the injection pressure in the desulfurization process is made higher than that in the temperature control process, or the interval of injection events in the desulfurization process is made shorter than that in the temperature control process, so that the air/fuel ratio of the exhaust gas is controlled to be rich.

In step 109 following step 107, it is determined that a condition of completion of sulfur regeneration is satisfied. The condition of completion of the sulfur regeneration may be set in various manners. For example, a set value for a period of time for which the desulfurization process is to be performed (i.e., the duration of the desulfurization process required for sulfur regeneration of the NOx storage agent 46) may be predetermined, and it may be determined whether the condition of completion of the sulfur regeneration is satisfied by comparing the set value with the actual time for which the desulfurization process has been performed. Since the temperature control process and the desulfurization process are normally repeated according to the invention, the actual value to be compared with the set value is the total period or duration of the plurality of times of the desulfurization processes.

In another example, a set value for the number of times the temperature control process and the desulfurization process are repeated (i.e., the number of times of repetition of the temperature control process and the desulfurization process required for sulfur regeneration of the NOx storage agent 46) may be predetermined, and it may be determined that the condition of completion of the sulfur regeneration is satisfied when the temperature control process and the desulfurization process have been repeated the set number of times.

In a further example, a SOx sensor for measuring the SOx concentration in the exhaust gas may be provided downstream of the NOx storage agent 46. In this case, it is determined that the condition of completion of the sulfur regeneration is satisfied when the SOx concentration measured by the SOx sensor is reduced to be equal to or lower than a predetermined value, which indicates that release of sulfur from the NOx storage agent 46 has finished.

If it is determined in step 109 that the condition of completion of the sulfur regeneration is satisfied, the present control routine is finished. Since the temperature control process and the desulfurization process are repeatedly executed in this routine, the condition of completion of the sulfur regeneration may be said to be equivalent to a condition under which the repetition of the temperature control process and the desulfurization process is finished.

If it is determined in step 109 that the condition of completion of the sulfur regeneration has not been satisfied, the control proceeds to step 111. In step 111, it is determined whether a second switching condition for switching control from the desulfurization process to the temperature control process is satisfied. The second switching condition is basically that the temperature of the NOx storage agent 46 comes out of the predetermined temperature range as described above, but may be set in various manners similar to those in the case of the first switching condition.

For example, it may be determined that the second switching condition is satisfied when the duration of the desulfurization process (i.e., the period of time for which the desulfurization process continues to be performed) has reached a predetermined time. This predetermined time may be a fixed time, or may be set in relation to the operating conditions of the engine, the method of injecting the reductant, and so forth, as in the case of the first switching condition.

Generally, if the air/fuel ratio of the exhaust gas flowing through the NOx storage agent 46 is controlled to be rich in the desulfurization process by, for example, injecting the reductant into the exhaust passage, the temperature of the NOx storage agent 46 gradually increases due to, for example, reaction of the reductant. As in the case of the first switching condition, the time required to raise the temperature of the NOx storage agent 46 to a level outside the predetermined temperature range in relation to the engine operating conditions, the method of injecting the reductant, and so forth may be determined in advance and plotted in the form of a map, and the predetermined time may be set according to the engine operating conditions detected at that time, based on the map.

Alternatively, a temperature sensor may be provided, and it may be determined whether the second switching condition is satisfied based on the temperature measured by the temperature sensor. In this case, it needs to be noted that the temperature range that provides a basis for the determination may differ from the predetermined temperature range as described above, depending upon which portion of the NOx storage agent 46 has the temperature measured by the temperature sensor, as in the case of the first switching condition.

In the case where the first switching condition is determined based on the temperature measured by the temperature sensor, and the temperature range that provides the basis for the determination is set in view of the location of the NOx storage agent 46 at which the temperature is measured by the temperature sensor and the temperature distribution that appears in the NOx storage agent 46, the second switching condition may be determined based on the temperature measured by the same temperature sensor, by using, as a basis for the determination, the same temperature range as that providing the basis for the determination of the first switching condition.

If it is determined in step 111 that the second switching condition is not satisfied, the control returns to step 107 to continue the desulfurization process. If it is determined that the second switching condition is satisfied, the control proceeds to step 103 to perform the temperature control process again. Thus, according to the present control routine, the temperature control process and the desulfurization process are repeatedly performed for sulfur regeneration until it is determined in step 109 that the condition of completion of sulfur regeneration is satisfied.

As explained above, a single sulfur regeneration procedure is performed according to the above method by repeating the temperature control process and the desulfurization process a plurality of times, and therefore the duration of a single desulfurization process is shortened. The reduction in the duration of the single desulfurization process makes is possible to perform sulfur regeneration even in the engine operating state in which the temperature of the NOx storage agent 46 would be excessively raised if the air/fuel ratio of the exhaust gas flowing through the NOx storage agent 46 is kept rich for a prolonged time for sulfur regeneration.

If the engine is an operating state that permits low-temperature combustion, low-temperature combustion may be performed with the air/fuel ratio controlled to be lean so as to raise the temperature of the NOx storage agent 46 in the temperature control process, or low-temperature combustion may be performed with the air/fuel ratio controlled to be rich in the desulfurization process.

In another example, one of the first and second switching conditions may be determined based on the duration of the temperature control process or the desulfurization process, and the other condition may be determined based on the temperature measured by a temperature sensor.

In a further example, where it is determined that the first switching condition is satisfied when the duration of the temperature control process reaches a predetermined time, and a temperature sensor for measuring the temperature of the NOx storage agent 46 is provided, the predetermined time set for the temperature control process may be corrected according to the rate of increase or decrease of the temperature of the NOx storage agent 46 measured by the temperature sensor. Similarly, where it is determined that the second switching condition is satisfied when the duration of the desulfurization process reaches a predetermined time, and a SOx sensor for measuring the SOx concentration in the exhaust gas is provided downstream of the NOx storage agent 46, the predetermined time set for the desulfurization process may be corrected according to the rate or speed of release of sulfur from the NOx storage agent 46.

In this manner, control is performed in accordance with the actual situation, and the temperature control process and the desulfurization process are performed with improved efficiency, so that the NOx storage agent 46 can be surely regenerated or recovered from sulfur poisoning.

Similarly, the air/fuel ratio of the exhaust gas flowing through the NOx storage agent 46 may be controlled in the temperature control process according to the rate of increase or decrease in the temperature of the NOx storage agent 46, and the air/fuel ratio of the exhaust gas flowing through the NOx storage agent 46 may be controlled in the desulfurization process according to the rate or speed of release of sulfur from the NOx storage agent 46. In this manner, too, the temperature control process and the desulfurization process are efficiently performed, and the NOx storage agent 46 can be surely regenerated or recovered from sulfur poisoning.

Figure 4:
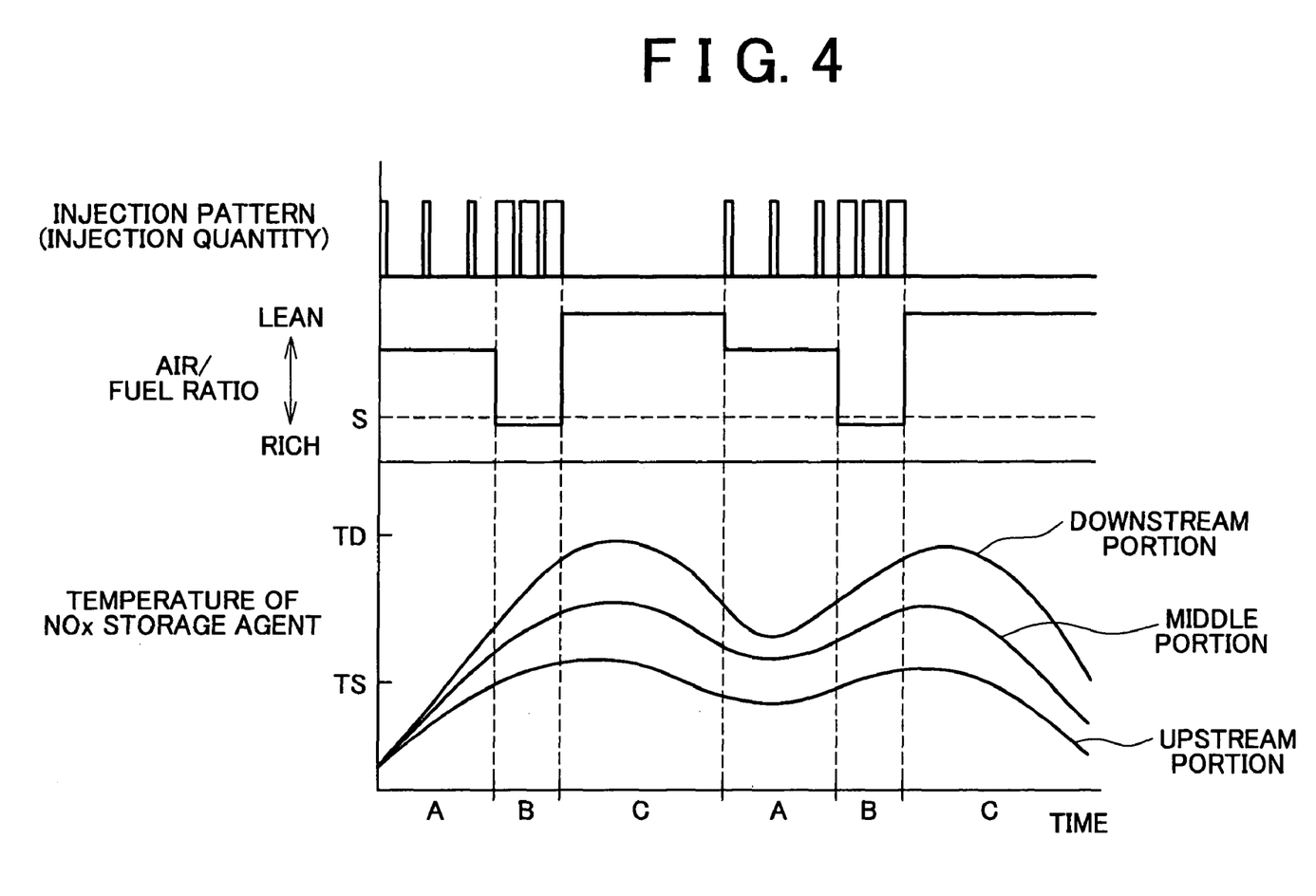
FIG. 4 is a time chart showing one example of changes in the temperature of the NOx storage agent when control is performed according to the control routine shown in FIG. 3, along with a pattern of injection of a reductant and changes in the air/fuel ratio of exhaust gas flowing through the NOx storage agent.

FIG. 4 shows an example of temperature changes in the NOx storage agent when control is performed according to the control routine shown in FIG. 3. In FIG. 4, the temperature changes are plotted along with a pattern of injection of the reductant and changes in the air/fuel ratio of the exhaust gas flowing through the NOx storage agent. In FIG. 4, period A is a period in which the temperature of the NOx storage agent is raised in the temperature control process, and period B is a period of the desulfurization process, while period C is a period in which the temperature of the NOx storage agent is lowered in the temperature control process. Also, S used in the section of FIG. 4 showing the air/fuel ratio represents the stoichiometric air/fuel ratio, TS used in the section showing the temperature of the NOx storage agent represents the desulfurization temperature, while TD used in the same section represents the heat deterioration temperature.

As shown in FIG. 4, the reductant is injected into the exhaust passage so as to raise the temperature of the NOx storage agent in period A. In period B, a larger amount of reductant is injected at shorter intervals as compared with the amount and the interval in period A, so that the air/fuel ratio of the exhaust gas is held rich. In the following period C, the injection of the reductant is stopped so as to lower the temperature of the NOx storage agent.

In the example shown in FIG. 4, it will be understood that the temperature is most likely to increase in the downstream portion of the NOx storage agent, and the temperature of the downstream portion may exceed the heat deterioration temperature TD if period B is prolonged, namely, if the injection of the reductant is not stopped after period C starts. Namely, the engine operating state in this example is such that the temperature of the NOx storage agent would be excessively raised if the air/fuel ratio of the flow-through exhaust gas is kept rich for a prolonged time in order to accomplish sulfur regeneration. Thus, control is performed according to the control routine shown in FIG. 3 so as to prevent an excessive increase in the temperature that would otherwise occur in this engine operating state.

In period B of the example shown in FIG. 4, the temperatures of the upstream, middle and downstream portions of the NOx storage agent are all within a temperature range that is at least the desulfurization temperature TS but is lower than the heat deterioration temperature TD. Accordingly, sulfur is released from the entire volume of the NOx storage agent, namely, the NOx storage agent as a whole is regenerated or recovered from sulfur poisoning.

Figure 5:
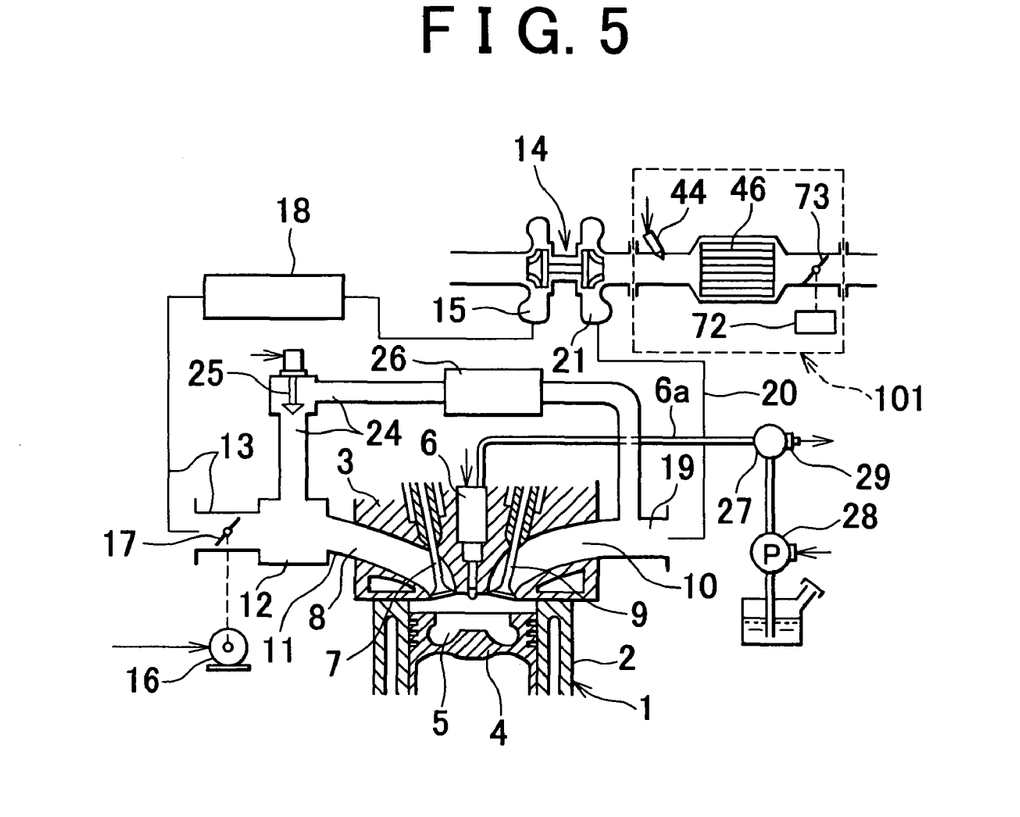
FIG. 5 is a view showing a system in which another example of an emission control device is employed in a direct fuel injection, compression ignition type internal combustion engine.

Referring next to FIG. 5, another sulfur regeneration method for regenerating the NOx storage agent 46 will be explained. FIG. 5 shows an internal combustion engine that is suitable for implementation of this method. In the engine of FIG. 5, an exhaust flow control valve 73 adapted to be driven by an actuator 72 is disposed in an exhaust pipe downstream of the NOx storage agent 46. By driving the exhaust flow control valve 73 by the actuator 72, the flow rate of the exhaust gas passing through the NOx storage agent 46 can be controlled as desired.

A control routine for this sulfur regeneration method is similar to that shown in FIG. 3, but is characterized in that the flow rate of the exhaust gas passing through the NOx storage agent 46 is controlled so that the temperature control process (step 103) and the desulfurization process (step 107) are performed with improved efficiency, while promoting release of sulfur from the NOx storage agent 46 (namely, promoting sulfur regeneration). Furthermore, this method enables sulfur regeneration to be performed in an even wider range of engine operating conditions.

In this method, when the temperature of the NOx storage agent 46 needs to be raised through injection of the reductant in the temperature control process of step 103 of the control routine of FIG. 3, the amount of the exhaust gas flowing through the NOx storage agent 46 is controlled to be as large as possible. As a result, a large amount of oxygen required for reaction is supplied to the NOx storage agent 46, and the temperature of the NOx storage agent 46 can be raised to a desired level in a relatively short time. When the temperature of the NOx storage agent 46 needs to be lowered, the amount of the exhaust gas flowing through the NOx storage agent 46 is controlled to be as large as possible while the injection of the reductant is stopped. As a result, heat of the NOx storage agent 46 is removed by the flowing exhaust gas, and the temperature of the NOx storage agent 46 can be lowered in a relatively short time.

On the other hand, when the air/fuel ratio of the exhaust gas flowing through the NOx storage agent 46 needs to be made rich by injecting the reductant into the exhaust gas passage in the desulfurization process of step 107 in the control routine of FIG. 3, the flow rate of the exhaust gas is reduced. As a result, the amount of the injected reductant required for making the air/fuel ratio of the exhaust gas rich can be reduced, assuring improved fuel economy. In this case, since the increase in the temperature of the NOx storage agent 46 in the desulfurization process is suppressed (i.e., since the temperature of the NOx storage agent 46 is less likely to be increased in the desulfurization process), release of sulfur (or sulfur regeneration) can be performed even in an engine operating state in which the temperature of the NOx storage agent 46 would be excessively raised if the flow rate of the exhaust gas cannot be controlled.

Thus, according to the above method, release of sulfur from the NOx storage agent 46 is promoted, and sulfur regeneration can be performed in an even wider range of engine operating conditions without excessively raising the temperature of the NOx storage agent 46.

The sulfur regeneration according to the above-described method may be performed and similar advantageous effects can be obtained in the case where emission control devices 102 and 103 constructed as explained below replace the emission control devices denoted by reference numerals 100 and 101 in FIG. 1 and FIG. 5.

Figure 7:
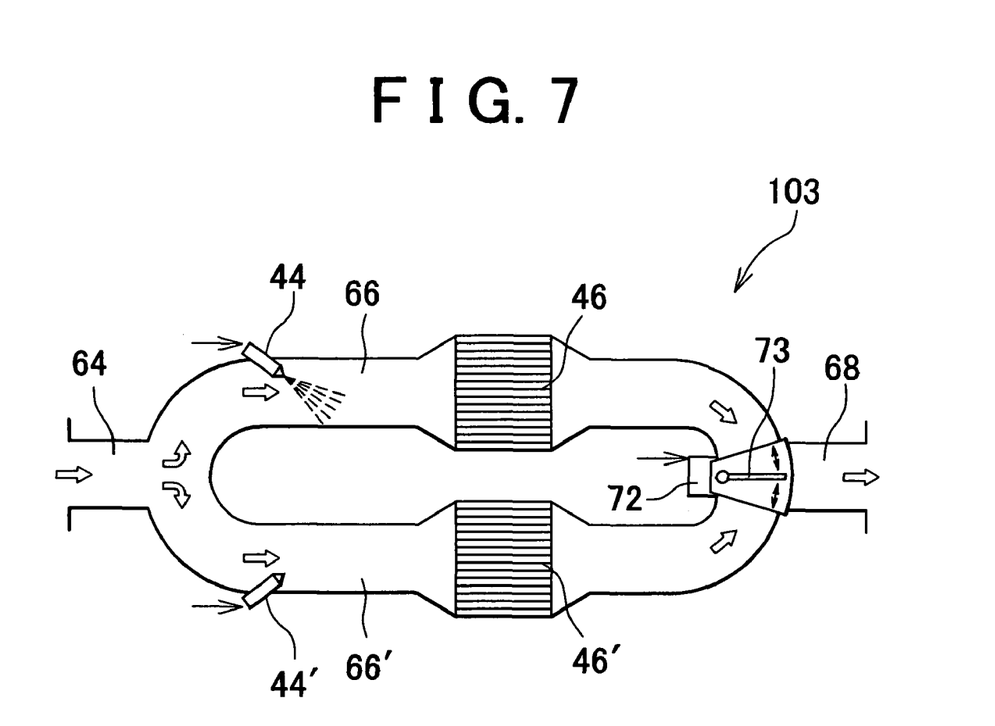
FIG. 7 is a view showing the construction of a still another example of an emission control device.

The emission control device 102 shown in FIG. 7 includes a main passage 60 having the NOx storage agent 46, and a bypass passage 62 that diverges from the main passage 60 at the upstream side of the NOx storage agent 46 and merges into the main passage 60 at the downstream side of the NOx storage agent 46. A reductant injection nozzle 44 for injecting a reductant into the main passage 60 is provided on the upstream side of the NOx storage agent 46 in the main passage 60. An exhaust flow control valve 73 adapted to be driven by an actuator 72 is provided in a joining portion of the main passage 60 and the bypass passage 62 located downstream of the NOx storage agent 46, for controlling the flow rates of exhaust gases passing through the main passage 60 and the bypass passage 62, respectively.

When the emission control device 102 is employed, the exhaust flow control valve 73 is used when the amount of the exhaust gas flowing through the NOx storage rate 46 needs to be controlled during execution of the above-described sulfur regeneration method. More specifically, the amount of the exhaust gas flowing through the NOx storage agent 46 is controlled by controlling the amounts of exhaust gases flowing through the main passage 60 and the bypass passage 62, respectively. Since the bypass passage 62 is employed in the emission control device 102, the amount of the exhaust gas flowing through the NOx storage agent 46 may be controlled without largely varying the total amount of exhaust gas flowing through the exhaust gas passage.

Figure 6:
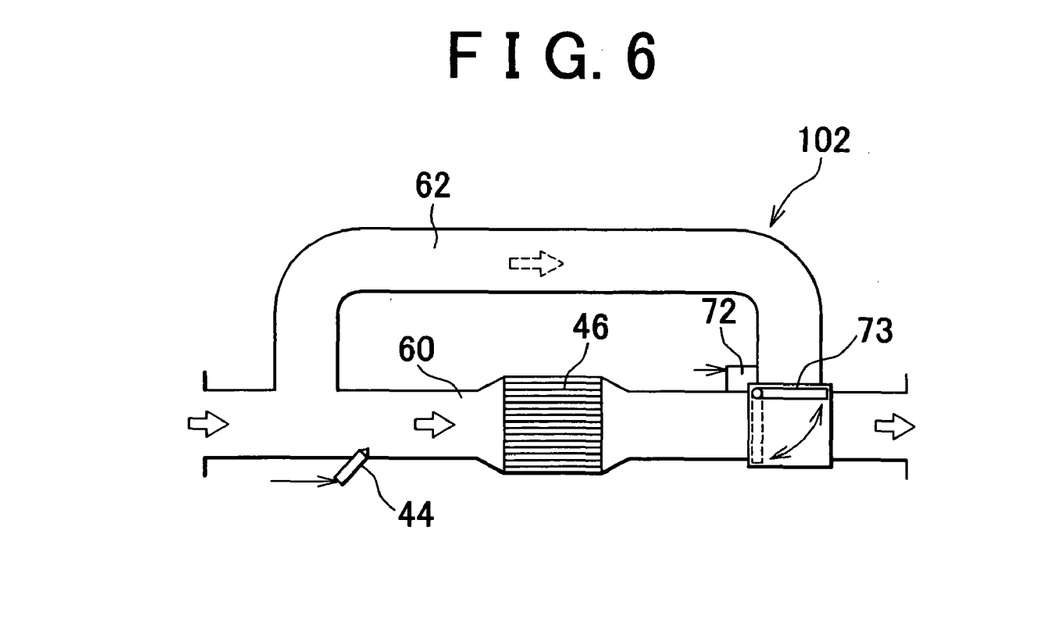
FIG. 6 is a view showing the construction of a further example of an emission control device.

A method of effecting the above-described sulfur regeneration method by using the emission control device 102 is apparent from the above description of this method and the relationship between components of each of the emission control devices 100, 101 shown in FIG. 1 and FIG. 5 and components of the emission control device 102 shown in FIG. 6, except for the use of the bypass passage 62 for controlling the flow of the exhaust gas as described above. Thus, detailed description of this method is not provided herein.

Next, the construction of the emission control device 103 shown in FIG. 7 will be explained. The emission control device 103 shown in FIG. 7 includes an upstream-side main passage 64, first and second branch passages 66, 66' into which the main passage 64 branches, and a downstream-side main passage 68 into which the branch passages 66, 66' join or merge. First and second NOx storage agents 46, 46' are respectively disposed in the first and second branch passages 66, 66'. Also, reductant injection nozzles 44, 44' for injecting a reductant into the respective branch passages 66, 66' are provided in the respective branch passages 66, 66' upstream of the corresponding NOx storage agents 46, 46'.

An exhaust flow control valve 73 adapted to be driven by an actuator 72 is provided in a joining portion of the two branch passages 66, 66' located downstream of the NOx storage agents 46, 46'. The exhaust flow control valve 73 functions to control the proportion of the flow rate of exhaust gas passing through the branch passage 66 and the flow rate of exhaust gas passing through the branch passage 66' as needed. The exhaust flow control valve 73 is normally placed at an intermediate position as shown in FIG. 7, such that the amount of the exhaust gas flowing through the first branch passage 66 is made substantially equal to the amount of the exhaust gas flowing through the second branch passage 66'.

A method of effecting the above-described sulfur regeneration method by using the emission control device 103 is apparent from the above description of this method and the relationship between components of each of the emission control devices 100, 101 shown in FIG. 1 and FIG. 5 and components of the emission control device 103 shown in FIG. 7. Thus, detailed description of the method is not provided herein. However, the construction of the emission control device 103 is different from those of the other emission control devices in that the branch passages 66, 66' are respectively provided with the NOx storage agents 46, 46' that need to be regenerated or recovered from sulfur poisoning. In the following, an operation of the emission control device 103 thus constructed will be described in greater detail.

In the emission control device 103, both of the NOx storage agents 46, 46' located at two different positions are required to be subjected to sulfur regeneration. Depending upon the selected method of performing sulfur regeneration, both of the NOx storage agents 46, 46' may be concurrently subjected to sulfur regeneration, or one of the NOx storage agents 46, 46' may be subjected to sulfur regeneration at a certain time while the other NOx storage agent 46, 46' may be subjected to sulfur regeneration at another time.

When the selected sulfur regeneration method requires control of the flow rate of the exhaust gas passing through the NOx storage agent to be regenerated, sulfur regeneration is performed on only one of the NOx storage agents 46, 46' at a time since the emission control device 103 is constructed such that the amount of the exhaust gas flowing through only one of the NOx storage agents 46, 46' can be controlled to a desired value. In this case, the exhaust flow control valve 73 is actuated so as to control the amount of the exhaust gas flowing through the NOx storage agent 46 or 46' to be regenerated, to the desired value, depending upon the process (i.e., temperature control process or desulfurization process) to be performed and its purpose. At the same time, a reductant is injected from the reductant injection nozzle 44 or 44' corresponding to the NOx storage agent 46, 46' to be regenerated, by a method suitable for the process to be performed and its purpose.

When the control of the exhaust flow rate is performed in the emission control device 103 as described above, exhaust gas that bypasses the NOx storage agent (e.g., 46) subjected to sulfur regeneration is caused to pass through the other NOx storage agent (e.g., 46') that is not subjected to sulfur regeneration. Accordingly, the exhaust gas is prevented from being released to the atmosphere without passing through any of the NOx storage agents 46, 46' even during the sulfur regeneration process.

When the selected sulfur regeneration method does not require control of the flow rate of the exhaust gas passing through the NOx storage agent to be regenerated, both of the NOx storage agents 46, 46' may be regenerated from sulfur poisoning at the same time, or one of the NOx storage agents 46, 46' may be regenerated at each time. Namely, the reductant injection nozzles 44, 44' are provided upstream of the respective NOx storage agents 46, 46' in the emission control device 103, and therefore the reductant may be injected from both of the reductant injection nozzles 44, 44' at the same time or may be injected from one of the nozzles 44, 44' at each time, depending upon the process to be performed and its purpose. Thus, the concurrent regeneration or separate regeneration of the NOx storage agents 46, 46' may be selected as desired by controlling the manner of injecting the reductant from the reductant injection nozzles 44, 44'.

In each of the illustrated embodiments, the temperature control means for controlling the temperature of the NOx storage agent 46 or 46' in the temperature control process and the air/fuel ratio control means for controlling the air/fuel ratio of the exhaust gas flowing through the NOx storage agent 46 or 46' in the desulfurization process are provided by the reductant injection nozzle 44 or 44' for injecting the reductant to the exhaust gas passage upstream of the NOx storage agent 46 or 46'. However, the invention is not limited to this arrangement. For example, post injection may be performed in place of or in addition to the injection of the reductant from the reductant injection nozzle 44 or 44' in each of the illustrated embodiments. The post injection is effected by injecting fuel from the fuel injectors 6 into the corresponding cylinders during the expansion stroke or exhaust stroke of the engine, thereby to control the temperature of the NOx storage agent 46 or 46' and control the air/fuel ratio of the exhaust gas flowing through the NOx storage agent 46 or 46'. Thus, the post injection provides similar effects to those provided by the injection of the reductant from the reductant injection nozzle 44 or 44'.

Where the post injection is performed in place of the injection of the reductant from the reductant injection nozzle 44 or 44', there is no need to provide the reductant injection nozzles 44 and 44', which advantageously simplify the construction of the emission control device.

When the post injection is effected for the above purpose, fuel serving as a reductant is injected into the cylinders of the engine. Therefore, it needs to be noted that in the case where a plurality of exhaust gas paths are provided in the emission control device, the reductant cannot be introduced individually to each of the exhaust gas paths. Namely, the reductant cannot be introduced to the plural exhaust gas paths in different manners. For example, when the post injection is performed in the engine provided with the emission control device 103 as shown in FIG. 7, the reductant cannot be introduced individually into the respective NOx storage agents 46, 46'. When the post injection is performed in the engine provided with the emission control device 102 as shown in FIG. 6, the exhaust gas to which the fuel (reductant) was added by post injection is caused to flow through the exhaust gas path having no NOx storage agent, resulting in waste of the fuel (reductant) and an increase in the fuel (reductant) released to the atmosphere.

While the sulfur regeneration has been described with respect to the embodiments or examples in which the NOx storage agent 46 or 46' is used as exhaust emission control means, the invention is not limited to these embodiments or examples, but may be applied to other exhaust emission control means capable of releasing sulfur in similar manners. For example, the invention may be applied to the control for releasing sulfur form a sulfur absorber catalyst, or the like.

What is claimed is:

1. An exhaust emission control method for treating exhaust gas emitted from an internal combustion engine, comprising the steps of:
   locating an emission control device in an exhaust gas passage of the internal combustion engine, the emission control device storing SOx when an air/fuel ratio of exhaust gas flowing through the emission control device is lean, and releasing the stored SOx when a temperature of the emission control device is raised to a desulfurization temperature or higher and the air/fuel ratio of the exhaust gas flowing through the emission control device becomes substantially equal to a stoichiometric air/fuel ratio or rich;
   performing a temperature control process to control the temperature of the emission control device to be within a predetermined temperature range whose lower limit is substantially equal to or higher than a desulfurization temperature and to raise the temperature of the emission control device only when the air/fuel ratio of exhaust gas is leaner than or equal to the stoichiometric air/fuel ratio; and
   performing a desulfurization process to release sulfur from the emission control device by controlling the air/fuel ratio of the exhaust gas flowing through the emission control device to be substantially equal to the stoichiometric air/fuel ratio or rich when the temperature of the emission control device is within the predetermined temperature range, wherein
   the temperature control process and the desulfurization process are repeated when sulfur is to be released from the emission control device.

2. The exhaust emission control method according to claim 1, wherein in the temperature control process, the temperature of the emission control device is raised or lowered by controlling the air/fuel ratio of the exhaust gas flowing through the emission control device.

3. The exhaust emission control method according to claim 1, wherein an amount of the exhaust gas flowing through the emission control device is larger in the temperature control process than that in the desulfurization process.

4. The exhaust emission control method according to claim 1, wherein the temperature control process and the desulfurization process are repeated until release of sulfur from the emission control device is finished.

5. The exhaust emission control method according to claim 1, wherein the temperature control process and the desulfurization process are repeated until a total time of execution of the desulfurization process reaches a set value.

6. The exhaust emission control method according to claim 1, wherein the temperature control process and the desulfurization process are repeated a predetennined number of times.

7. The exhaust emission control method according to claim 1, wherein the temperature control process continues for a first predetermined period of time and the desulfurization process continues for a second predetermined period of time.

8. The exhaust emission control method according to claim 7, wherein at least one of the first predetermined period of time and the second predetermined period of time is determined depending upon an operating state of the internal combustion engine.

9. The exhaust emission control method according to claim 7, wherein the first predetermined period of time for the temperature control process is corrected according to a rate of increase or decrease of the temperature of the emission control device, and the second predetermined period of time for the desulflurization process is corrected according to a speed of release of sulfur from the emission control device.

10. The exhaust emission control method according to claim 1, wherein the air/fuel ratio of the exhaust gas flowing through the emission control device is controlled in the temperature control process according to a rate of increase or decrease of the temperature of the emission control device, and the air/fuel ratio of the exhaust gas flowing through the emission control device is controlled in the desulfurization process according to a speed of release of sulfur from the emission control device.

11. The exhaust emission control method according to claim 1, wherein the emission control device comprises a NOx storage agent that stores NOx when the air/fuel ratio of the exhaust gas flowing through the NOx storage agent is lean, and releases the stored NOx for reduction and removal when the air/fuel ratio of the exhaust gas flowing through the NOx storage agent is reduced and a reductant is present in the exhaust gas.

12. An exhaust emission control system for treating exhaust gas emitted from an internal combustion engine, comprising:
   an emission control device disposed in an exhaust gas passage of the internal combustion engine, the emission control device storing SOx when an air/fuel ratio of exhaust gas flowing through the emission control device is lean, and releasing the stored SOx when a temperature of the emission control device is raised to a desulfurization temperature or higher and the air/fuel ratio of the exhaust gas flowing through the emission control device becomes substantially equal to a stoichiometric air/fuel ratio or rich; and
   a controller that:
   performs a temperature control process to control the temperature of the emission control device to be within a predetermined temperature range whose lower limit is substantially equal to or higher than the desulfurization temperature and to raise the temperature of the emission control device only when the air/fuel ratio of exhaust gas is leaner than or equal to the stoichiometric air/fuel ratio; and
   performs a desulfurization process to release sulfur from the emission control device by controlling the air/fuel ratio of the exhaust gas flowing through the emission control device to be substantially equal to the stoichiometric air/fuel ratio or rich when the temperature of the emission control device is within the predetermined temperature range, wherein the controller repeats the temperature control process and the desulfurization process when sulfur is to be released from the emission control device.

13. The exhaust emission control system according to claim 12, wherein in the temperature control process, the controller raises or lower the temperature of the emission control device by controlling the air/fuel ratio of the exhaust gas flowing through the emission control device.

14. The exhaust emission control system according to claim 12, wherein the controller controls an amount of the exhaust gas flowing through the emission control device to be larger in the temperature control process than that in the desulfurization process.

15. The exhaust emission control system according to claim 12, wherein the controller repeats the temperature control process and the desulfurization process until release of sulfur from the emission control device is finished.

16. The exhaust emission control system according to claim 12, wherein the controller repeats the temperature control process and the desulfurization process until a total time of execution of the desulfurization process reaches a set value.

17. The exhaust emission control system according to claim 12, wherein the controller repeats the temperature control process and the desulfurization process a predetermined number of times.

18. The exhaust emission control system according to claim 12, wherein the controller continues the temperature control process for a first predetermined period of time and continues the desulfurization process for a second predetermined period of time.

19. The exhaust emission control system according to claim 18, wherein at least one of the first predetermined period of time and the second predetermined period of time is determined depending upon an operating state of the internal combustion engine.

20. The exhaust emission control system according to claim 18, wherein the first predetermined period of time for the temperature control process is corrected according to a rate of increase or decrease of the temperature of the emission control device, and the second predetermined period of time for the desulfurization process is corrected according to a speed of release of sulfur from the emission control device.

21. The exhaust emission control system according to claim 12, wherein the controller controls the air/fuel ratio of the exhaust gas flowing through the emission control device in the temperature control process according to a rate of increase or decrease of the temperature of the emission control device, and controls the air/fuel ratio of the exhaust gas flowing through the emission control device in the desulfurization process according to a speed of release of sulfur from the emission control device.

22. The exhaust emission control system according to claim 12, wherein the emission control device comprises a NOx storage agent that stores NOx when the air/fuel ratio of the exhaust gas flowing through the NOx storage agent is lean, and releases the stored NOx for reduction and removal when the air/fuel ratio of the exhaust gas flowing through the NOx storage agent is reduced and a reductant is present in the exhaust gas.

23. The exhaust emission control method according to claim 1, wherein:

performing a temperature control process to control the temperature of the emission control device to be within a predetermined temperature range whose lower limit is substantially equal to or higher than a desulfurization temperature and to raise the temperature of the emission control device only when the air/fuel ratio of exhaust gas is leaner than or equal to the stoichiometric air/fuel ratio comprises performing a temperature control process to raise the temperature of the emission control device only when the air/fuel ratio of exhaust gas is leaner than the stoichiometric air/fuel ratio.

24. The exhaust emission control system according to claim 12, wherein:

the controller performs a temperature control process to raise the temperature of the emission control device only when the air/fuel ratio of exhaust gas is leaner than the stoichiometric air/fuel ratio.

* * * * *